United States Patent
Buchmann et al.

(10) Patent No.: US 10,508,730 B2
(45) Date of Patent: Dec. 17, 2019

(54) METHOD FOR AN OPEN-LOOP AND/OR CLOSED-LOOP CONTROL OF A HYDRAULIC SYSTEM OF A MOTOR VEHICLE

(71) Applicant: Volkswagen Aktiengesellschaft, Wolfsburg (DE)

(72) Inventors: René Buchmann, Gifhorn (DE); Stefan Giggel, Adenbüttel (DE); Dennis Losereit, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 310 days.

(21) Appl. No.: 15/644,782

(22) Filed: Jul. 9, 2017

(65) Prior Publication Data
US 2017/0307065 A1   Oct. 26, 2017

Related U.S. Application Data

(63) Continuation of application No. PCT/EP2016/050949, filed on Jan. 19, 2016.

(30) Foreign Application Priority Data

Jan. 23, 2015   (DE) .................. 10 2015 201 107

(51) Int. Cl.
*F16H 61/00* (2006.01)
*F16H 57/04* (2010.01)
(Continued)

(52) U.S. Cl.
CPC .......... *F16H 57/0446* (2013.01); *F01M 1/02* (2013.01); *F01M 1/16* (2013.01);
(Continued)

(58) Field of Classification Search
CPC ......... F16H 61/0031; F16H 2061/0037; F04B 17/03; F04B 17/05
(Continued)

(56) References Cited

U.S. PATENT DOCUMENTS 6,386,170 B1 * 5/2002 Iwano ................. F16H 61/0031
                                                                    123/196 R
7,415,820 B2 * 8/2008 Moorman ........... F16H 61/0031
                                                                    60/430

(Continued)

FOREIGN PATENT DOCUMENTS

CN       102077000 A     5/2011
DE       101 62 973 A1   8/2002
(Continued)

OTHER PUBLICATIONS

Office Action and machine translation thereof, dated Aug. 3, 2018, issued by the State Intellectual Property Office of People's Republic of China for Chinese Patent Application No. 201680006805.4 which is related to U.S. Appl. No. 15/644,782.

(Continued)

*Primary Examiner* — Michael Leslie
(74) *Attorney, Agent, or Firm* — Manfred Beck, P.A.

(57) ABSTRACT

A method for the control of a hydraulic system of a motor vehicle is provided. A high-pressure branch is fed by a main oil pump which is driven by an internal combustion engine. The high-pressure branch or a low-pressure branch is fed by an additional oil pump depending on a switch position of a switching valve. The additional oil pump is used for feeding the high-pressure branch or the low-pressure branch depending on a total volume flow demand and on the volume flow available from the main oil pump. A nominal rotation speed of an electric motor which drives the additional oil pump is determined based on a volume flow balance, a valve status of the switching valve, a low-pressure pump map or a (Continued)

high-pressure pump map. Depending on the valve status, either the low-pressure pump map or the high-pressure pump map is used to determine the nominal rotation speed.

11 Claims, 6 Drawing Sheets

(51) Int. Cl.
| | |
|---|---|
| *F01M 1/02* | (2006.01) |
| *F01M 1/16* | (2006.01) |
| *F01M 11/00* | (2006.01) |
| *F01P 5/12* | (2006.01) |
| *F04B 17/03* | (2006.01) |
| *F04B 17/05* | (2006.01) |
| *F04B 23/04* | (2006.01) |
| *F01P 5/10* | (2006.01) |

(52) U.S. Cl.
CPC ............ *F01M 11/0004* (2013.01); *F01P 5/12* (2013.01); *F04B 17/03* (2013.01); *F04B 17/05* (2013.01); *F04B 23/04* (2013.01); *F16H 57/0435* (2013.01); *F16H 57/0439* (2013.01); *F16H 57/0475* (2013.01); *F16H 61/0031* (2013.01); *F01P 2005/105* (2013.01); *F01P 2005/125* (2013.01); *F16H 2061/0037* (2013.01)

(58) Field of Classification Search
USPC .................................. 60/428, 429, 430, 431
See application file for complete search history.

(56) References Cited

U.S. PATENT DOCUMENTS 7,481,053 B2 * 1/2009 Kitano ................ F16H 61/0031
60/431

| | | |
|---|---|---|
| 2002/0091034 A1 | 7/2002 | Nakamori et al. |
| 2008/0188351 A1 | 8/2008 | Schiele et al. |
| 2009/0232673 A1 | 9/2009 | Reisch et al. |
| 2010/0216597 A1 | 8/2010 | Grundler et al. |
| 2011/0120568 A1 | 5/2011 | Borntraeger et al. |
| 2011/0144846 A1 | 6/2011 | Zöllner et al. |
| 2012/0055146 A1 | 3/2012 | Baraga et al. |
| 2012/0103709 A1 | 5/2012 | Mochiyama et al. |

FOREIGN PATENT DOCUMENTS

| | | |
|---|---|---|
| DE | 10 2008 040 667 A1 | 1/2010 |
| DE | 10 2008 041 402 A1 | 2/2010 |
| DE | 10 2009 001 110 A1 | 8/2010 |
| DE | 10 2009 019 959 A1 | 11/2010 |
| DE | 10 2009 050 462 A1 | 4/2011 |
| DE | 10 2009 054 754 A1 | 6/2011 |
| DE | 10 2013 201 266 A1 | 7/2014 |
| DE | 10 2013 109 047 B3 | 12/2014 |
| EP | 1 861 637 B1 | 12/2009 |
| JP | 2012-97813 A | 5/2012 |
| JP | 2013-217492 A | 10/2013 |
| WO | 2006/136320 A1 | 12/2006 |

OTHER PUBLICATIONS

Search Report including Provisional Assessment of Patentability issued by the German Patent and Trademark Office for German Patent Application No. DE 10 2015 201 107.0, dated Oct. 22, 2015.
International Search Report for International Application No. PCT/EP2016/050949 and translation thereof, dated Apr. 21, 2016.
International Preliminary Report on Patentability for International Application No. PCT/EP2016/050949 including Written Opinion of the International Searching Authority and translation thereof, dated Jul. 25, 2017.

* cited by examiner

METHOD FOR AN OPEN-LOOP AND/OR CLOSED-LOOP CONTROL OF A HYDRAULIC SYSTEM OF A MOTOR VEHICLE

CROSS-REFERENCE TO RELATED APPLICATIONS

This application is a continuation, under 35 U.S.C. § 120, of copending International Application No. PCT/EP2016/050949, filed Jan. 19, 2016, which designated the United States; this application also claims the priority, under 35 U.S.C. § 119, of German Patent Application No. DE 10 2015 201 107.0, filed Jan. 23, 2015; the prior applications are herewith incorporated by reference in their entirety.

BACKGROUND OF THE INVENTION

Field of the Invention

The invention concerns a method for the open-loop and/or closed-loop control of a hydraulic system of a motor vehicle.

The generic German Patent Application Publication No, DE 10 2008 040 667 A1 discloses a hydraulic system of a transmission device and a corresponding method for operating such a hydraulic system. The hydraulic system has a main oil pump and an additional oil pump. The main oil pump can be driven functionally actively by means of the internal combustion engine. The additional oil pump can be driven by means of an electric motor. The hydraulic system has a high-pressure branch and a low-pressure branch. The high-pressure branch may also be known as the primary circuit and the low-pressure branch as the secondary circuit. The main oil pump is connected on the output side to the primary circuit. The main oil pump is furthermore connected to the secondary circuit via a pressure-limiting valve. The additional oil pump is connected to the output side of the main oil pump via a check valve. The additional oil pump is also connected to the secondary circuit via a switching valve. The pressure side of the additional oil pump may be brought into active connection with the secondary circuit via a hydraulic line which can be blocked in the direction of the primary circuit and secondary circuit and which bypasses the pressure-limiting valve. This hydraulic line contains a corresponding switching valve. The switching valve can be switched into a state opening the hydraulic line and a state blocking the hydraulic line. When the hydraulic line is opened by the switching valve, the secondary circuit is fed by the additional oil pump. When the hydraulic line is blocked by the switching valve, the primary circuit is fed by the additional oil pump. The switching valve is pre-controlled by an electrically controllable solenoid valve. Thus, depending on the switch position of the switching valve, the additional oil pump can deliver either into the high-pressure branch or into the low-pressure branch. In a corresponding method for operating the hydraulic system, it is proposed that the additional oil pump delivers into the primary circuit when the delivery volume of the main oil pump is less than a threshold value. When the delivery volume of the main oil pump is greater than a corresponding threshold value, the switching valve is switched such that the hydraulic line is opened and the additional oil pump delivers into the secondary circuit or low-pressure branch. The main oil pump feeds at least the primary pressure circuit with hydraulic oil. In one embodiment, the switching valve is able to switch without electrical control between the state opening the hydraulic line and the state blocking the hydraulic line because the switching valve is actuated as a function of the main pressure of the primary circuit. Here it may be provided that the switching valve blocks the hydraulic line at a main pressure of less than or equal to a predefined threshold value, and opens the hydraulic line at a main pressure greater than the threshold value. Alternatively, the switching valve can be pre-controlled by an electrically controllable solenoid valve.

European Patent Document No. EP 1 861 637 B1 describes a hydraulic system for a motor vehicle and a method for open-loop and/or closed-loop control of such a hydraulic system. The motor vehicle is equipped with a start-stop functionality and with a hybrid drive. The hydraulic system has a main oil pump and an additional oil pump. The main oil pump can be driven by an internal combustion engine, and the additional pump can be driven by an electric motor. The hydraulic system has a main pressure branch and a low-pressure branch. The main oil pump provides the oil pressure for setting the main pressure and the low-pressure through a main pressure valve. A transmission lubrication and cooling for the start-up element are assigned to the low-pressure branch. A main pressure valve is arranged between the main pressure branch and the low-pressure branch, with which an oil pressure generated by the main oil pump can be set to a main pressure for supplying the main pressure branch and to a low pressure for supplying the low-pressure branch. A connecting line connects a low-pressure output of the main pressure valve and low-pressure branch together, A check valve is arranged in a further line between the main pressure branch and the connecting line, which prevents oil from flowing into the low-pressure branch but allows oil to flow into the main pressure branch under low pressure. A switching valve is arranged in the low-pressure branch. An oil line departs from the switching valve to elements of a transmission lubrication, and a further oil line to elements of the start-up cooling system. An element is provided for determining the oil quantity demand, which detects the current and/or immediately impending demand for oil quantity of the hydraulic control devices of the automatic transmission and/or start-up element. Here, the current oil pump power of the main oil pump is determined. An additional oil quantity demand is determined from the oil quantity demand and the oil pump power of the main oil pump. In one operating mode of the hydraulic system, the main oil pump is stopped and the additional oil pump is driven. The switching valve is actuated such that the lubricating oil supply to the transmission and the cooling oil supply to the start-up element or corresponding clutch via the electrically driven additional oil pump are at least largely suppressed. The electrically driven additional oil pump here generates an oil pressure, so that this oil pressure is conducted to a pressure regulator for the selection elements of the automatic transmission, wherein the selection elements can be kept prefilled or can be prefilled. In the first operating mode, it is ensured that even if the drive engine is switched off, namely the internal combustion engine is switched off, an adequate oil pressure supply for pre-filling is guaranteed so that after the drive engine has started, start-up, i.e. driving away, can be carried out rapidly if required. A back-flow via the main pressure valve into the common oil reservoir is prevented because the main pressure valve is closed, or a check valve between the main oil pump and the main pressure valve stands in the blocked position, or the main oil pump itself creates an adequate blocking effect. In a second operating mode of the hydraulic system, both the main oil pump and the additional oil pump are driven. The switching valve is opened substantially to supply cooling oil to the start-up element. The main pressure valve is set such that a switching pressure is present at the pressure regulator which is sufficient for switching the selection elements of the transmission. The main pressure valve conducts an oil flow to the switching valve, wherein the pressure of this oil flow is lower than the pressure leading to the pressure regulator. The electrically driven additional oil pump still delivers at least the oil flow which, in addition to the oil flow provided by the mechanically driven main oil pump, is required for cooling the start-up element. In this second operating mode, both oil pumps are in operation but the power consumption of the additional oil pump is limited to only the scope absolutely necessary for safe operation, which is intended to save fuel and avoid unnecessary pollutant emissions.

German Patent Application Publication No. DE 101 62 973 A1 discloses a hydraulic system and a method for operating such a hydraulic system. The hydraulic system has a main oil pump and an additional oil pump. The main oil pump is driven by an internal combustion engine of the motor vehicle. The additional oil pump is driven by an electric motor. A drive control device for the additional oil pump detects a hydraulic clutch pressure, and drives the electric additional oil pump such that a necessary hydraulic pressure is maintained. The drive control device detects an oil temperature and controls the operating voltage of the electric pump on the basis of the oil temperature. In this way, the hydraulic pressure supplied by the electric oil pump should maintain the hydraulic pressure necessary for the hydraulic control of the automatic transmission, and prevent the supply of a greater hydraulic pressure than is necessary.

German Patent Application Publication No. DE 10 2008 041 402 A1 describes a drive train of a motor vehicle with a corresponding hydraulic system. The hydraulic system has a main oil pump which can be driven by an internal combustion engine, and an electrically operated additional oil pump. A control device controls an electric motor of the additional oil pump such that the additional oil pump is switched on only when a current hydraulic oil demand of the transmission cannot be provided by the main oil pump, and if the hydraulic oil temperature is less than a corresponding limit value, and if a preceding switch-on duration of the additional oil pump is less than a corresponding limit value. In the connected state; the electric motor can be operated in a first power stage with a relatively low rotation speed or in a second power stage with a relatively high rotation speed; depending on a brake pedal actuation; a selector lever position of the transmission selector lever, an actual gear engaged and a drive pedal actuation of an accelerator pedal.

The generic method for open-loop and/or closed-loop control of the hydraulic system is not yet configured optimally. An open-loop and/or closed-loop control of the hydraulic system adapted to demand is only available in restricted form in the prior art.

SUMMARY OF THE INVENTION

The invention is therefore based on the object of configuring and refining the method cited above for controlling the hydraulic system such that a demand-adapted open-loop and/or closed-loop control is possible.

With the foregoing and other objects in view there is provided, in accordance with the invention, a method for an open-loop control and/or a closed-loop control of a hydraulic system of a motor vehicle, the method including:

providing a main oil pump driven by an internal combustion engine;

providing an additional oil pump driven by an electric motor;

providing a high-pressure branch, wherein the high-pressure branch is at least partially fed by the main oil pump;

providing a low-pressure branch;

feeding the high-pressure branch or the low-pressure branch through use of the additional oil pump depending on a switch position of a switching valve, wherein the additional oil pump is used for feeding the high-pressure branch or the low-pressure branch depending on a total volume flow demand and a volume flow available from the main oil pump; and determining a nominal rotation speed of the electric motor based on a volume flow balance, a valve status of the switching valve, and a low-pressure pump map or a high-pressure pump map, wherein, depending on the valve status of the switching valve, either the low-pressure pump map or the high-pressure pump map is used for determining the nominal rotation speed of the electric motor.

In other words, according to the invention, there is provided a method for the open-loop and/or closed-loop control of a hydraulic system (1) of a motor vehicle, wherein a main oil pump (2) is driven by an internal combustion engine (VKM), wherein an additional oil pump (3) is driven by an electric motor (4), wherein a high-pressure branch (10) is at least partially fed by the main oil pump (2), wherein the high-pressure branch (10) or a low-pressure branch (11) is fed by the additional oil pump (3) depending on the switch position of a switching valve (18), wherein the additional oil pump (3) is used for feeding the high-pressure branch (10) or the low-pressure branch (11) depending on a total volume flow demand ($Q_{B,Tot}$) and on the volume flow ($Q_{VKM}$) available through the use of the main oil pump (2), wherein a nominal rotation speed ($n_{EM,Nom}$) of the electric motor (4) is determined on the basis of a volume flow balance ($\Delta Q_3$), a valve status of the switching valve (18), a low-pressure pump map (26) or a high-pressure pump map (27), wherein depending on the valve status, either the low-pressure pump map (26) or the high-pressure pump map (27) is used to determine the nominal rotation speed ($n_{EM,Nom}$).

Another mode of the invention includes determining a volume flow control deviation based on the nominal rotation speed of the electric motor, an actual rotation speed of the electric motor, the valve status of the switching valve, and the low-pressure pump map or the high-pressure pump map, wherein depending on the valve status, either the low-pressure pump map or the high-pressure pump map is used for determining the volume flow control deviation.

A further mode of the invention includes determining the volume flow balance based on the volume flow control deviation plus a difference between the total volume flow demand and the volume flow available from the main oil pump.

Another mode of the invention includes providing the main oil pump as a fixed displacement pump.

Yet another mode of the invention includes providing the main oil pump as a variable displacement pump; and calculating an adjustment factor by dividing the total volume flow demand by a maximum possible delivery volume flow of the variable displacement pump, wherein, if the adjustment factor assumes a value of less than one, a variable volume flow is calculated by multiplying the adjustment factor by the maximum possible delivery volume flow of the variable displacement pump, and otherwise the maximum possible delivery volume flow of the variable displacement pump is used as the volume flow available from the variable displacement pump.

Another mode of the invention includes feeding the low-pressure branch with the additional oil pump precisely when the total volume flow demand cannot be covered solely by the volume flow available from the main oil pump, but a volume flow demand of the high-pressure branch can be covered by the volume flow available from the main oil pump.

A further mode of the invention includes delivering into the high-pressure branch with the additional oil pump when the volume flow available from the main oil pump alone can neither cover the total volume flow demand nor a volume flow demand of the high-pressure branch.

Another mode of the invention includes the step of ensuring, through use of a suitable system configuration, a supply to the low-pressure branch through leakage.

Another mode of the invention includes supplying, in driving situations in which the internal combustion engine is switched off, at least the high-pressure branch by using the additional oil pump, wherein gears are selected and deselected or preselected depending on a speed of the motor vehicle in order to avoid high rotation speeds of transmission components or a clutch components co-rotating on an output side.

With the objects of the invention in view there is further provided a control configuration, including:

a control unit for an open-loop control and/or a closed-loop control of a hydraulic system of a motor vehicle, wherein a main oil pump is driven by an internal combustion engine, wherein an additional oil pump is driven by an electric motor, wherein a high-pressure branch is at least partially fed by the main oil pump, wherein the high-pressure branch or a low-pressure branch is fed by the additional oil pump in dependence on a switch position of a switching valve, wherein the additional oil pump is used for feeding the high-pressure branch or the low-pressure branch in dependence on a total volume flow demand and a volume flow available from the main oil pump; and the control unit determining a nominal rotation speed of the electric motor based on a volume flow balance, a valve status of the switching valve, and a low-pressure pump map or a high-pressure pump map, wherein depending on the valve status of the switching valve, either the low-pressure pump map or the high-pressure pump map is used for determining the nominal rotation speed of the electric motor.

Accordingly, a control unit is provided which includes software for implementing the method according to the invention.

With the objects of the invention in view there is further provided a hydraulic system which includes:

a main oil pump driven by an internal combustion engine;
an additional oil pump;
a high-pressure branch configured to be at least partially fed by the main oil pump;
a low-pressure branch;
a switching valve, the high-pressure branch or the low-pressure branch being fed by the additional oil pump in dependence on a switch position of the switching valve, wherein the additional oil pump feeds the high-pressure branch or the low-pressure branch in dependence on a total volume flow demand and a volume flow available from the main oil pump; and
the additional oil pump being driven by an electric motor, wherein a nominal rotation speed of the electric motor is determined based on a volume flow balance, a valve status of the switching valve, and a low-pressure pump map or a high-pressure pump map such that, depending on the valve status of the switching valve, either the low-pressure pump map or the high-pressure pump map is used for determining the nominal rotation speed of the electric motor.

A hydraulic system is therefore provided that is configured to implement the method according to the invention.

The object on which the invention is based is achieved by a method with the steps defined above. A nominal rotation speed of the electric motor is determined on the basis of a valve status of the switching valve and a low-pressure pump map and a high-pressure pump map. Depending on the switch position of the switching valve, namely depending on the valve status, either the low-pressure pump map or the high-pressure pump map is used. The low-pressure pump map is used if the additional oil pump feeds the low-pressure branch. The high-pressure pump map is used if the additional oil pump feeds the high-pressure branch. The low-pressure pump map describes the correlation between the delivery volume of the additional oil pump into the low-pressure branch and the rotation speed of the electric motor required for this. The high-pressure pump map describes the correlation between the delivery volume of the additional oil pump into the high-pressure branch and the rotation speed of the electric motor required for this. Since the pressure levels in the high-pressure circuit and low-pressure circuit are different, different rotation speeds are required in order to achieve the same delivery volume. The low-pressure pump map and the high-pressure pump map may be dependent on various factors: for example, the pressure level in the high-pressure branch and in the low-pressure branch, the oil temperature, the number and configuration of actuators of the high-pressure branch, the configuration and arrangement of the components to be cooled and/or lubricated, and similar. The low-pressure pump map and the high-pressure pump map may be determined by measurements. Because the correspondingly measured low-pressure pump map and the corresponding high-pressure pump map are used for open-loop and/or closed-loop control of the electric motor of the additional oil pump, the open-loop and/or closed-loop control can be more precisely adapted to demand. The method and the associated hydraulic system have the advantage that a demand-adapted open-loop and/or closed-loop control of the hydraulic system is achieved, in particular of the electric motor of the additional oil pump.

The demand is preferably determined as follows. Firstly the actual rotation speed of the electric motor is determined. Further, the total volume flow demand is determined. This total volume flow demand can be determined by adding the volume flow demand of the high-pressure branch and the volume flow demand of the low-pressure branch. A specific volume flow is provided by the main oil pump. This provided volume flow is compared with the total volume flow demand. If the total volume flow demand is less than or equal to the volume flow available from the main oil pump, the additional oil pump is not required; the nominal rotation speed of the electric motor may be set to zero. This can be achieved by a corresponding design or layout of the low-pressure pump map and the corresponding high-pressure pump map.

If the total volume flow demand cannot be covered by the volume flow available from the main oil pump, the consumer with the highest priority, namely the volume flow demand of the high-pressure branch, is compared to the volume flow available from the main oil pump. If the volume flow demand of the high-pressure branch can be covered by the main oil pump, the hydraulic switching valve is actuated such that the low-pressure branch is fed amongst others by the additional oil pump. The switching valve is in particular closed here. Firstly, the surplus supply from the main oil pump is distributed to the lower priority low-pressure branch. Secondly, the remaining volume flow demand of the low-pressure branch is covered using the electrically driven additional oil pump, wherein the additional oil pump is controlled by means of the low-pressure pump map until the volume flow demand of the low-pressure branch is covered.

If the volume flow available from the main oil pump is not sufficient to cover the volume flow demand of the main pressure branch, the hydraulic switching valve is actuated such that the high-pressure branch is additionally fed by means of the additional oil pump. The switching valve is here in particular opened. At least the volume flow demand shortfall in the high-pressure branch is now covered by the additional oil pump. Preferably, the additional oil pump delivers more than the volume flow demand shortfall in the high-pressure branch, so that by corresponding system design of the hydraulic system with corresponding leakage points, at the same time the supply to the low-pressure branch is ensured. Preferably, leakage points are present between the high-pressure branch and the low-pressure branch, so that the surplus volume flow is conducted to the low-pressure branch for cooling and lubrication purposes.

The closed-loop control or adjustment control of the electric pump is configured as follows. For the correct assessment of the actual situation of the volume flow demand of the hydraulic system, a volume flow control deviation is added to a first volume flow balance. The first volume flow balance in turn results from the demand of the high-pressure branch plus the demand of the low-pressure branch minus the volume flow available from the main oil pump. In order to form the volume flow control deviation, first the difference between the actual rotation speed of the electric motor and the nominal rotation speed of the electric motor is determined. Then the volume flow control deviation is determined from the valve status, the low-pressure pump map or the corresponding high-pressure pump map, and the difference in rotation speed between the nominal rotation speed and the actual rotation speed. The volume flow control deviation is added to the first volume flow balance, giving a further volume flow balance. Depending on valve status and the further volume flow balance thus determined, the corresponding pump map for the high-pressure branch or the low-pressure branch gives the nominal rotation speed for the electric motor.

In one embodiment, the main oil pump is formed as a fixed displacement pump. The fixed displacement pump may here be configured as a reduced stroke fixed displacement pump.

In an alternative embodiment, the main oil pump is formed as a variable displacement pump to generate a specific variable volume flow. For this, an adjustment factor is now taken into account in the method. The adjustment factor results from dividing the demand of the hydraulic regions of the high-pressure branch and low-pressure branch by the maximum possible delivery volume flow of the variable displacement pump. Only if the adjustment factor assumes a value of less than one, the variable flow quantity is calculated by multiplying the adjustment factor by the maximum delivery volume flow. Otherwise, if the adjustment factor assumes a value of greater than one, the variable displacement pump is opened to the maximum and in the further assessment regarded as a fixed displacement pump. The adjustment factor is determined in the method. From this, the pump adjustment can be calculated via a separate main oil pump map of the variable displacement pump. The main oil pump map can be determined for example by corresponding test bench measurements.

If the variable displacement pump is adjusted hydraulically, the calculated adjustment requirement is in turn included in the volume flow demand of the high-pressure branch as an additional requirement.

There are various application possibilities of the method. In particular in driving situations in which the internal combustion engine is switched off, the additional oil pump can supply at least the high-pressure branch so that gears, i.e. gear stages, can be selected and deselected or preselected. Furthermore, the additional oil pump guarantees at least a wheelset lubrication. When being towed or when coasting ("sailing"), or on use of a start-stop system, the internal combustion engine is switched off but gears can be engaged accordingly depending on the speed of the vehicle, in order to avoid excessive rotation speeds of components of the transmission or clutch co-rotating on the output side.

In particular, the motor vehicle has a start-stop system. With the method, in particular a start-stop system is possible even at higher drive speeds and/or coasting ("sailing") of the motor vehicle with the internal combustion engine switched off is conceivable, wherein the gears can be selected as a function of the speed, at the appropriate time the clutch can be engaged and the engine started.

Furthermore, with the method, demand-adapted open-loop and/or closed-loop control of the additional oil pump is guaranteed even with a higher cooling oil demand, so that even with a high cooling oil demand, a corresponding start-stop function or "sailing" is possible. The availability of the start-stop function or "sailing" is thus increased.

Losses from the provision of auxiliary hydraulic energy for activation and for cooling and lubrication purposes can be reduced. It is conceivable that an electrohydraulic parking lock can be activated by means of the hydraulic system. Such parking locks are also known as "park-by-wire".

The disadvantages cited initially are therefore avoided and corresponding advantages achieved.

There are now a number of possibilities for configuring and further refining the method according to the invention. For this, reference is first of all made to the claims. Other features which are considered as characteristic for the invention are set forth in the appended claims. A preferred embodiment of the invention is explained in more detail below with reference to the drawing and the associated description.

Although the invention is illustrated and described herein as embodied in a method for an open-loop and/or closed-loop control of a hydraulic system of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
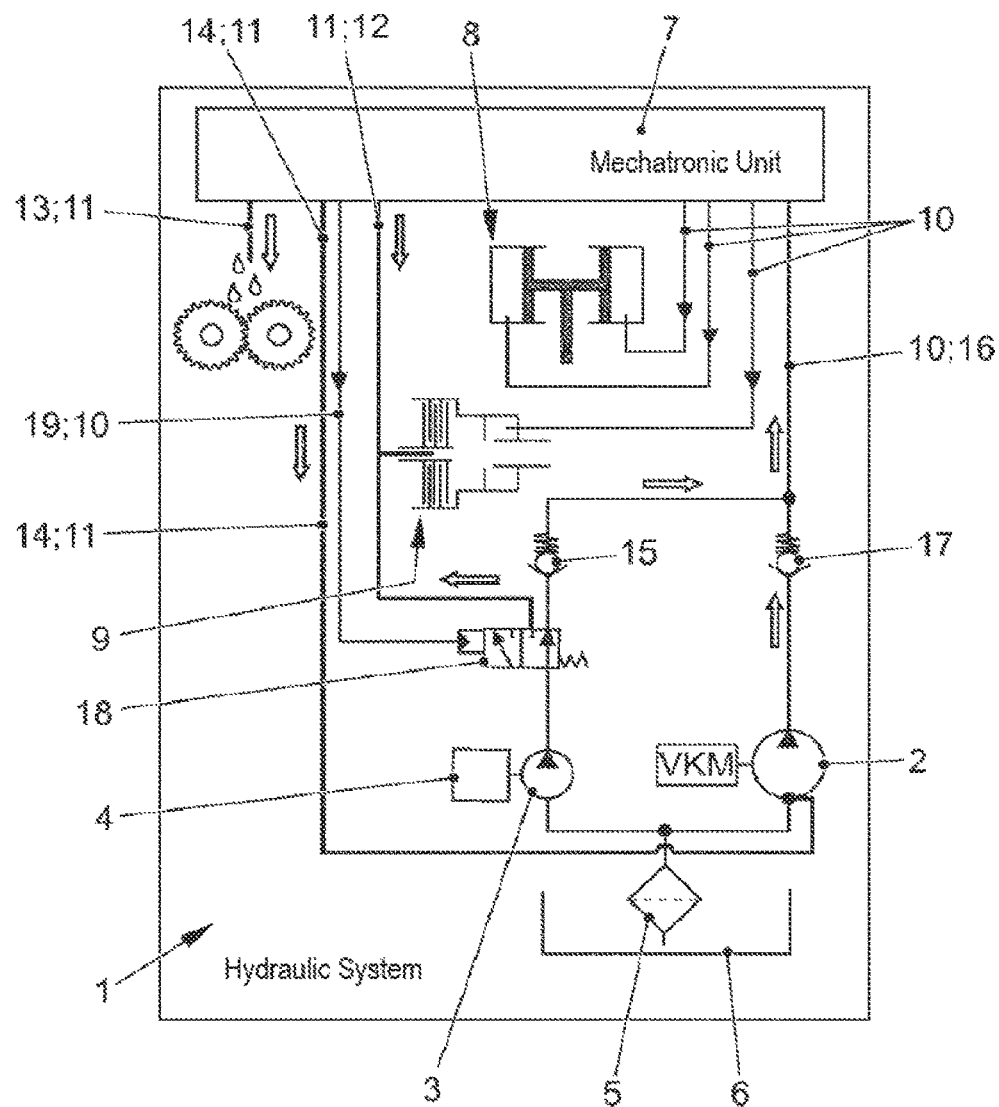
FIG. 1 is a highly diagrammatic depiction of a hydraulic system with a main oil pump and an additional oil pump in accordance with the invention.

Referring now to the figures of the drawing in detail and first, particularly, to FIG. 1 thereof, there is shown a hydraulic system 1. The hydraulic system 1 has a main oil pump 2. The main oil pump 2 is driven by an internal combustion engine VKM. The hydraulic system 1 furthermore has an additional oil pump 3. The additional oil pump 3 is driven by an electric motor 4. The main oil pump 2 and the additional oil pump 3 deliver transmission oil via a suction filter 5 from a transmission oil sump 6. The main oil pump 2 supplies transmission oil to a mechatronic unit 7. Corresponding actuators 8 or also a clutch 9 are supplied with pressurized oil from the mechatronic unit 7. The clutch 9 is in particular formed as a dual clutch.

The hydraulic system 1 now has a high-pressure branch 10 and a low-pressure branch 11. The actuators 8 and the clutch 9 are part of the high-pressure branch 10. A cooling system 12, a wheelset lubrication 13 and a return 14 are part of the low-pressure branch 11. The transmission is supplied with cooling oil or lubricating oil via the cooling system 12 or the wheelset lubrication 13, as indicated in FIG. 1 by the two pinions on the left of the illustration.

The additional oil pump 3 now delivers corresponding oil to the mechatronic unit 7 in parallel to the main oil pump 2. Here, a check valve 15 is provided between the mechatronic unit 7 and the additional oil pump 3. The check valve 15 may be integrated in the mechatronic unit 7 or arranged separately from the mechatronic unit 7, and be connected to the mechatronic unit 7 via a supply line 16.

Furthermore, preferably a check valve 17 is arranged in the supply line 16 downstream of the main oil pump 2. In one embodiment, the check valve 17 may be integrated in the main oil pump 2. Alternatively, the check valve 17 may be integrated in the mechatronic unit 7 or formed separately from the main oil pump 2 and the mechatronic unit 7, and arranged as depicted in FIG. 1. In the embodiment shown in FIG. 1, the main oil pump 2 is configured as a fixed displacement pump. In an alternative embodiment, the main oil pump 2 may be configured to be adjustable, or be configured as a variable displacement pump.

A switching valve 18 is now provided downstream of the additional oil pump 3. The one output of the switching valve 18 is functionally actively connected to the check valve 15 and hence to the supply line 16 of the high-pressure branch 10. The other output of the switching valve 18 is connected to the low-pressure branch 11. The switching valve 18 is configured as a slide valve. It is reset via a spring. The switching valve 18 is activated via an electric pre-control valve (not shown) in the mechatronic unit 7. The switching valve 18 is for this connected to the mechatronic unit 7 via a control line 19. The control line 19 is part of the high-pressure branch 10.

The main oil pump 2 can now be charged by the additional oil pump 3, wherein the mechatronic unit 7 is connected via the return 14 to the intake tract of the main oil pump 2. The return 14 or the corresponding supply line can be switched by means of the mechatronic unit 7. If no pressurized oil and no cooling oil volume flow are required, apart from system leakages, the oil volume flow from the additional oil pump 3 flows via the return 14 into the intake tract of the main oil pump 2. When the intake tract of the main oil pump 2 is filled with oil, no intake difficulties occur. The transmission oil flows back accordingly into the transmission oil sump 6 via a further return (not shown).

The open-loop or closed-loop control of the hydraulic system 1, in particular of the electric motor 4 and switching valve 18, will now be explained below with reference to FIG. 2. The method is implemented in a control unit.

The input parameters of the method are the actual rotation speed $n_{EM,Act}$ of the electric motor 4 and the volume flow demands—namely the volume flow demand $Q_{HD}$ of the consumers of the high-pressure branch 10, and the volume flow demand $Q_{ND}$ of the consumers of the low-pressure branch 11—and the volume flow $Q_{VKM}$ available from the main oil pump 2. The various hydraulic regions, namely the high-pressure branch 10 and the low-pressure branch 11, each report a different demand in the form of volume flow demands $Q_{HD}$ and $Q_{ND}$.

The volume flow demand $Q_{HD}$ includes the leakage of the high-pressure branch 10, a dynamic reserve for actuating the clutch 9, a dynamic reserve for actuating the gear selector and a dynamic safety reserve, and special states. Special states include for example start-stop driving situations, sailing with the internal combustion engine switched off, and similar. The leakage may be obtained from a map measured on the test bench.

The volume flow demand $Q_{ND}$ of the low-pressure branch 11 may include in particular the demand for cooling 12 of the clutch 9, the demand for wheelset lubrication 13 and where applicable a safety offset.

The volume flow $Q_{VKM}$ describes the volume flow currently delivered by the main oil pump 2. The volume flow $Q_{VKM}$ available from the main oil pump 2 may be formed preferably from a temperature $T_{sump}$ of the transmission oil in the transmission oil sump 6 and from the rotation speed $n_{VKM}$ of the internal combustion engine VKM by means of a corresponding map.

Firstly, the open-loop control of the switching valve 18 depending on the volume flow demands $Q_{HD}$ and $Q_{ND}$ will be explained:

In a method step 20, the volume flow demands $Q_{HD}$ and $Q_{ND}$ are added to form a total volume flow demand $Q_{B,Tot}$. In a method step 21, the total volume flow demand $Q_{B,Tot}$ is compared with the supply provided by the mechanical pump, namely the volume flow $Q_{VKM}$. In the method step 21, the difference between $Q_{B,Tot}$ and $Q_{VKM}$ is formed. The result of the method step 21 is the volume flow balance $\Delta Q_1$, This first volume flow balance $\Delta Q_1$ may be positive or negative. The total volume flow demand $Q_{B,Tot}$ is included positively in the first volume flow balance $\Delta Q_1$. The volume flow $Q_{VKM}$ available from the main oil pump 2 is included negatively in the first volume flow balance $\Delta Q_1$.

If the first volume flow balance $\Delta Q_1$ has a value of less than or equal to zero, the supply available from the main oil pump 2 is sufficient. The electric additional oil pump 3 is not switched on. The nominal rotation speed $n_{EM,Nom}$ (setpoint rotation speed) of the electric motor 4 is set to zero (see FIG. 2).

If the first volume flow balance $\Delta Q_1$ has a value greater than zero, the total volume flow demand $Q_{B,Tot}$ cannot be covered solely by the main oil pump 2. In this case, in a further method step 22, a second volume flow balance $\Delta Q_2$ is formed, wherein the volume flow demand $Q_{HD}$ of the high-pressure branch 10 is compared with the volume flow $Q_{VKM}$ available from the main oil pump 2. The volume flow demand $Q_{HD}$ is included positively and the available volume flow $Q_{VKM}$ negatively in the second volume flow balance $\Delta Q_2$. From this second volume flow balance $\Delta Q_2$, it can be seen whether the supply provided by the main oil pump 2, namely the volume flow $Q_{VKM}$ available from the main oil pump 2, is sufficient to cover the volume flow demand $Q_{HD}$ of the high-pressure branch 10.

Figure 4:
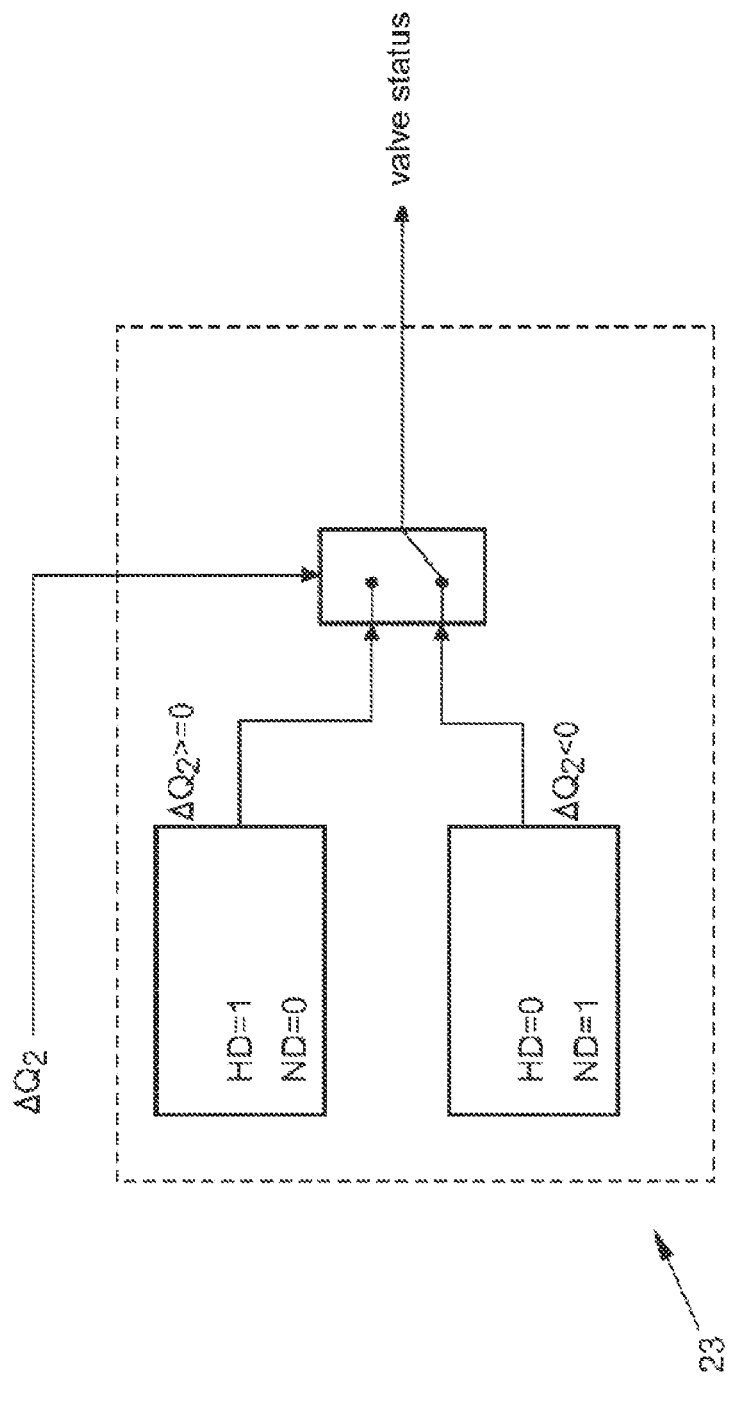
FIG. 4 is a diagrammatic depiction of the determination of a valve status in accordance with the invention.

Depending on whether the volume flow balance $\Delta Q_2$ is greater than, equal to or less than zero, the valve status HD and ND is set. This method step 23 is depicted in FIG. 4. If the second volume flow balance $\Delta Q_2$ is greater than or equal to zero, the volume flow $Q_{VKM}$ from the main oil pump 2 is not sufficient to supply the consumers with highest priority with the volume flow demand $Q_{HD}$ of the high-pressure branch 10. The hydraulic switching valve 18 is opened so that the additional oil pump 3 supplies a volume flow additionally to the high-pressure branch 10. The low-pressure branch 11 is here now no longer directly supplied with a volume flow from the additional oil pump 3. In the case where $\Delta Q_2$ is greater than zero, a corresponding system design with sufficient leakages at the same time ensures the supply of the low-pressure branch 11 with the volume flow demand $Q_{ND}$. The valve status HD=1, ND=0 is output.

The additional oil pump 3 delivers to the high-pressure branch 10 if the volume flow $Q_{VKM}$ available from the main oil pump 2 alone can no longer cover either the total volume flow demand $Q_{B,Tot}$ or the volume flow demand $Q_{HD}$ of the high-pressure branch 10.

In the case where the second volume flow balance $\Delta Q_2$ is less than zero, the supply from the main oil pump 2, namely the volume flow $Q_{VKM}$ available from the main oil pump 2, is sufficient to supply the consumers of the high-pressure branch 10 with the corresponding volume flow. The hydraulic switching valve 18 is closed. Thus in a further step, firstly the surplus amount available or the volume flow balance $\Delta Q_2$ is distributed into the low-pressure branch 11. Secondly, the remaining demand is controlled using the additional oil pump 3 in the required range, namely up to the volume flow demand $Q_{ND}$ or above. The valve status HD=0, ND=1 is output.

The additional oil pump 3 feeds the low-pressure branch 11 precisely when the total volume flow demand $Q_{B,Tot}$ cannot be covered solely by the main oil pump 2, but the volume flow demand $Q_{HD}$ of the high-pressure branch 10 can be covered by the volume flow $Q_{VKM}$ available from the main oil pump 2.

Figure 5:
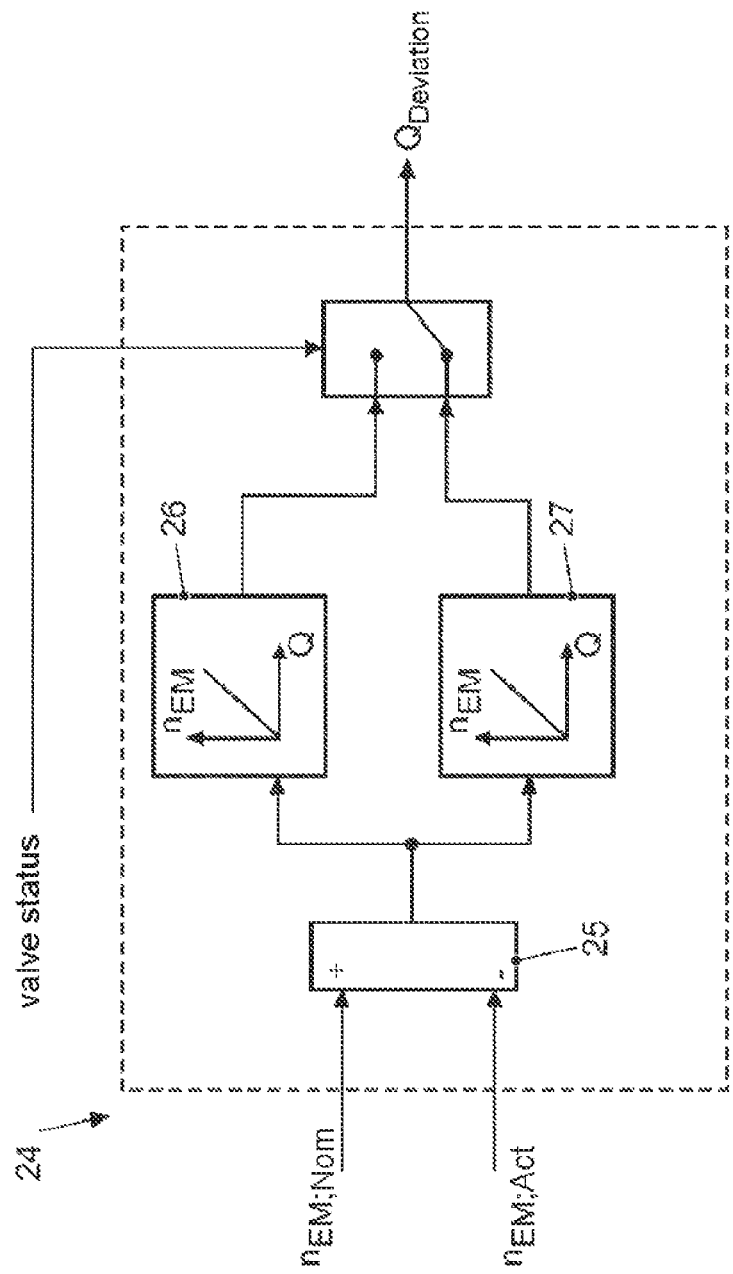
FIG. 5 is a diagrammatic depiction of the determination of a volume flow control deviation through the use of the two pump maps in accordance with the invention.

The closed-loop control of the additional oil pump 3 will now be discussed with reference to FIGS. 2, 3 and 5.

Figure 2:
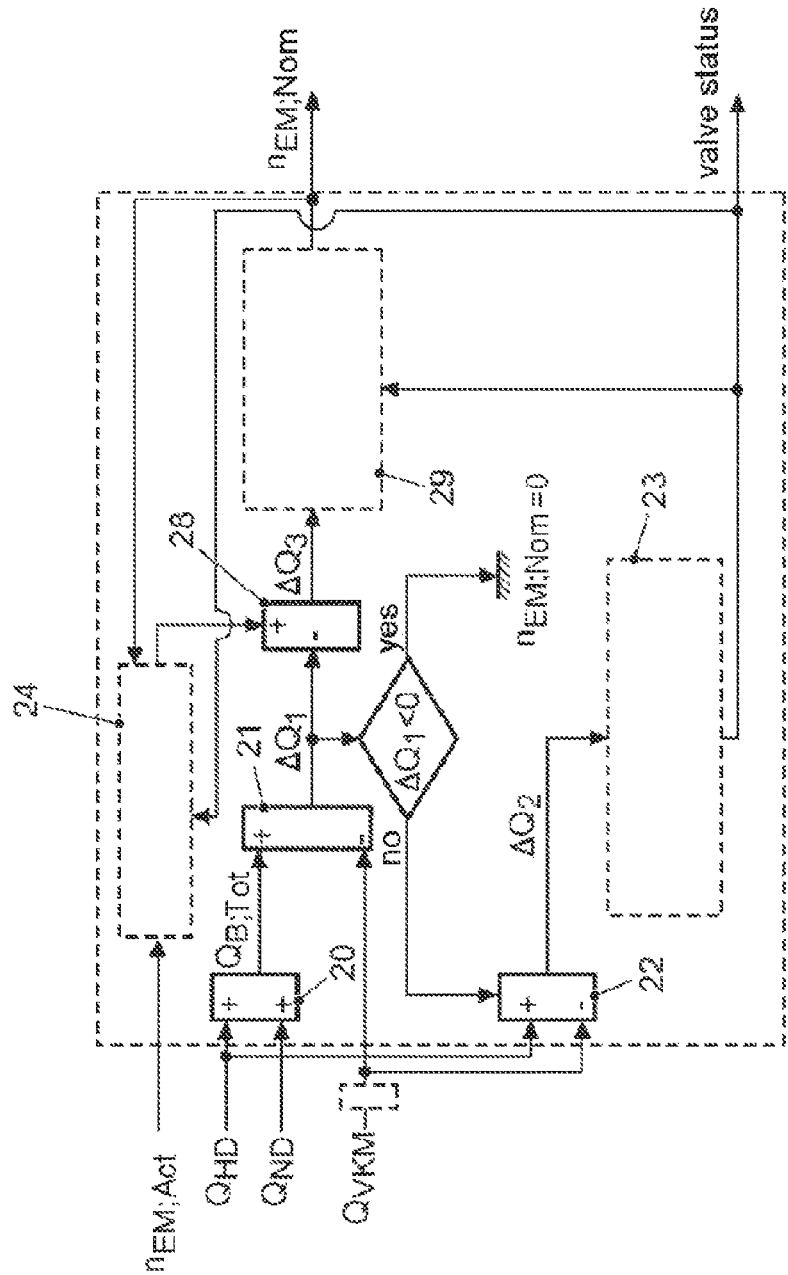
FIG. 2 is a diagrammatic depiction of the control system of the additional oil pump according to the invention.
Figure 3:
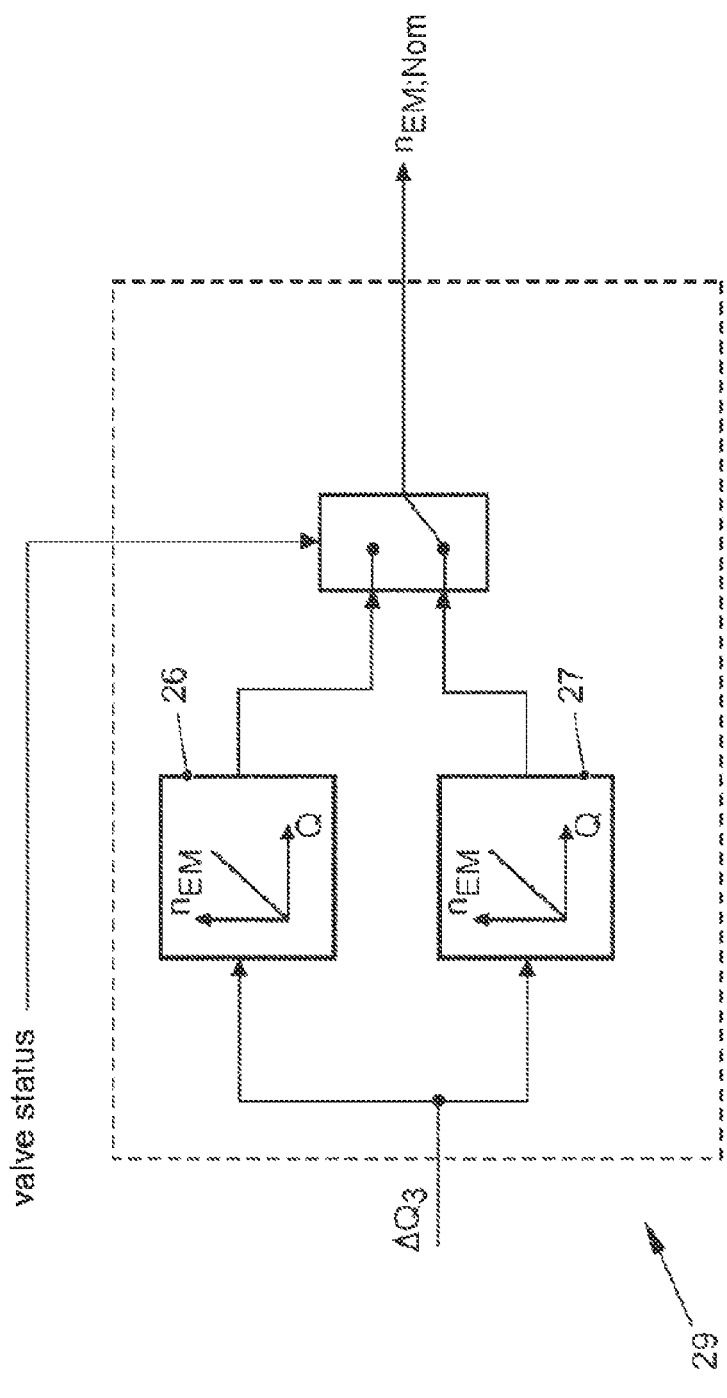
FIG. 3 is a diagrammatic depiction of the determination of a nominal rotation speed of the electric motor of the additional oil pump through the use of two pump maps, namely a high-pressure pump map and a low-pressure pump map in accordance with the invention.

In a method step 24, a volume flow control deviation $Q_{Deviation}$ is now formed from the valve status, the nominal rotation speed $n_{EM,Nom}$ of the electric motor 4 and an actual rotation speed $n_{EM,Act}$ of the electric motor 4 (see FIG. 2 and FIG. 4).

The disadvantages cited initially are now avoided in that the nominal rotation speed $n_{EM,Nom}$ of the electric motor 4 is determined from the third volume flow balance $\Delta Q_3$, the valve status of the switching valve 18, a low-pressure pump map 26 or a high-pressure pump map 27, wherein depending on the valve status, either the low-pressure pump map 26 or the high-pressure pump map 27 is used to determine the nominal rotation speed $n_{EM,Nom}$. The high-pressure pump map 27 is based on measurements and describes as precisely as possible the correlation between the rotation speed of the electric motor $n_{EM}$ and the volume flow delivered at this speed by the additional oil pump 3 into the high-pressure branch 10. The low-pressure pump map 26 is also based on measurements and describes as precisely as possible the correlation between the rotation speed $n_{EM}$ of the electric motor 4 and the volume flow delivered at this speed by the additional oil pump 3 into the low-pressure branch 11.

For this (see FIG. 5), in a method step 25, the difference between the nominal rotation speed $n_{EM,Nom}$ and the actual rotation speed $n_{EM,Act}$ is formed. Now using the low-pressure pump map 26 or high-pressure pump map 27, a volume flow control deviation $Q_{Deviation}$ is determined. The low-pressure pump map 26 is used if the switching valve 18 is closed and the additional oil pump 3 is delivering into the low-pressure branch 11, i.e. valve status HD=0, ND=1. The high-pressure pump map 27 is used if the switching valve 18 is open and the additional oil pump 3 is delivering into the high-pressure circuit 10, i.e. valve status HD=1, ND=0.

In a method step 28 (see FIG. 2), a third volume flow balance $\Delta Q_3$ is now determined from the first volume flow balance $\Delta Q_1$ and the volume flow control deviation $Q_{Deviation}$. This third volume flow balance $\Delta Q_3$ is used in a method step 29 (see FIG. 2 and FIG. 3) to determine the nominal rotation speed $n_{EM,Nom}$ of the additional oil pump 3 using the low-pressure pump map 26 or high-pressure pump map 27, depending on the valve status. Depending on the valve status, either the low-pressure pump map 26 or the high-pressure pump map 27 is used. The low-pressure pump map 26 is used when the switching valve 18 is closed and the additional oil pump 3 is delivering into the low-pressure branch 11. The high-pressure pump map 27 is used when the switching valve 18 is open and the additional oil pump 3 is delivering into the high-pressure circuit 10.

The delivery quantity OEM of the additional oil pump 3 also depends on the temperature $T_{Sump}$ of the oil in the transmission oil sump 6, wherein the correlation between the nominal rotation speed $n_{EM,Nom}$ and the delivery quantity $Q_{EM}$ can be described for example by a further map.

Figure 6:
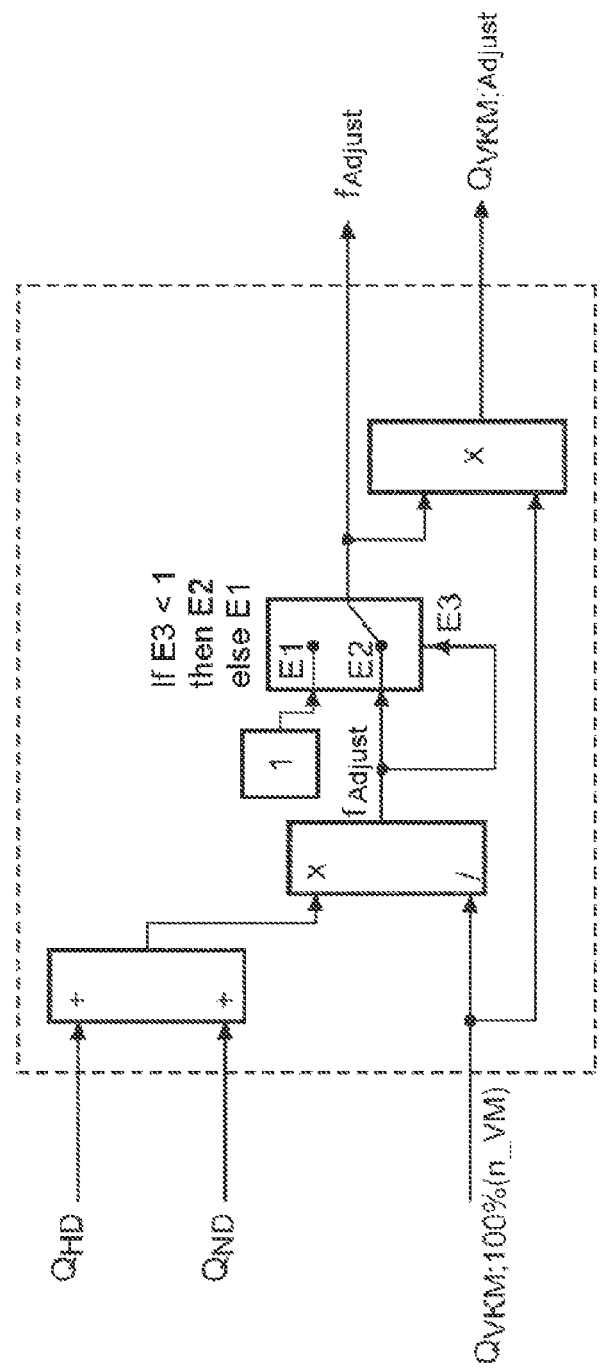
FIG. 6 is a diagrammatic depiction of a control system of an optional variable displacement pump according to the invention.

The optional variable displacement pump mechanism will now be discussed below in more detail with reference to FIG. 6. The method takes into account a variable displacement pump mechanism for generating the flow quantity $Q_{VKM}$ and an adjustment factor $f_{Adjust}$. Firstly, the adjustment factor $f_{Adjust}$ is calculated. This results from dividing the total volume flow demand $Q_{B,Tot}$ (=$Q_{HD}$+$Q_{ND}$) by the maximum possible delivery volume flow $Q_{VKM,100\% \ (n\_VKM)}$ of the variable displacement pump. The maximum possible delivery volume flow $Q_{VKM,100\% \ (n\_VKM)}$ is dependent on the current rotation speed $n_{VKM}$ of the internal combustion engine VKM. Only if the adjustment factor $f_{Adjust}$ has a value of less than one is the variable delivery volume flow $Q_{VKM,Adjust}$ calculated by multiplying the adjustment factor $f_{Adjust}$ by the maximum possible delivery volume flow $Q_{VKM,100\% \ (n\_VKM)}$. The delivery volume flow $Q_{VKM,Adjust}$ here forms the volume flow $Q_{VKM}$ available from the main oil pump 2.

Otherwise, the variable displacement pump is opened to the maximum and can be regarded in the further assessment as a fixed displacement pump. The maximum possible delivery volume flow $Q_{VKM,100\% \ (n\_VKM)}$ is used as the available volume flow $Q_{VKM}$. In addition, the model outputs the adjustment factor $f_{Adjust}$. From this, via a separate map of the variable displacement pump, the pump adjustment can be calculated. If the variable displacement pump is adjusted hydraulically, the calculated adjustment requirement is included in the volume flow demand $Q_{HD}$ as an additional requirement.

LIST OF REFERENCE CHARACTERS

1 Hydraulic system
2 Main oil pump
3 Additional oil pump
4 Electric motor
5 Suction filter
6 Transmission oil sump
7 Mechatronic unit
8 Actuator
9 Clutch
10 High-pressure branch
11 Low-pressure branch
12 Cooling
13 Wheelset lubrication
14 Return
15 Check valve
16 Supply line
17 Check valve
18 Switching valve
19 Control line
20 Method step: addition of $Q_{HD}$ and $Q_{ND}$
21 Method step: formation of difference between $Q_{B,Tot}$ and $Q_{VKM}$
22 Method step: formation of difference between $Q_{HD}$ and $Q_{VKM}$
23 Method step: determination of valve status
24 Method step: determination of volume flow control deviation $Q_{Deviation}$
25 Method step: formation of difference between $N_{EM,Nom}$ and $n_{EM,Act}$
26 Low-pressure pump map
27 High-pressure pump map
28 Method step: determination of volume flow balance $\Delta Q_3$
29 Method step: determination of $n_{EM,Nom}$
VKM Internal combustion engine
$n_{EM,Act}$ Actual rotation speed of electric motor
$N_{EM,Nom}$ Nominal rotation speed of electric motor
$Q_{HD}$ Volume flow demand of high-pressure circuit
$Q_{ND}$ Volume flow demand of low-pressure circuit
$Q_{VKM}$ Volume flow available from main oil pump
$Q_{B,Tot}$ Total volume flow demand
$\Delta Q_1$ First volume flow balance
$\Delta Q_2$ Second volume flow balance
$\Delta Q_3$ Third volume flow balance
$Q_{Deviation}$ Volume flow control deviation
$n_{VKM}$ Current rotation speed of internal combustion engine
$Q_{VKM,100\%\,(n\_VKM)}$ Maximum possible delivery volume flow of variable displacement pump
$Q_{VKM,Adjust}$ Delivery volume flow of variable displacement pump
$f_{Adjust}$ Adjustment factor

What is claimed is:

1. A method for at least one of an open-loop control and a closed-loop control of a hydraulic system of a motor vehicle, the method comprising:
providing a main oil pump driven by an internal combustion engine;
providing an additional oil pump driven by an electric motor;
providing a high-pressure branch, wherein the high-pressure branch is at least partially fed by the main oil pump;
providing a low-pressure branch;
feeding one of the high-pressure branch and the low-pressure branch through use of the additional oil pump depending on a switch position of a switching valve, wherein the additional oil pump is used for feeding one of the high-pressure branch and the low-pressure branch depending on a total volume flow demand and a volume flow available from the main oil pump; and
determining a nominal rotation speed of the electric motor based on a volume flow balance, a valve status of the switching valve, and one of a low-pressure pump map and a high-pressure pump map, wherein, depending on the valve status of the switching valve, either the low-pressure pump map or the high-pressure pump map is used for determining the nominal rotation speed of the electric motor.

2. The method according to claim 1, which comprises determining a volume flow control deviation based on the nominal rotation speed of the electric motor, an actual rotation speed of the electric motor, the valve status of the switching valve, and one of the low-pressure pump map and the high-pressure pump map, wherein depending on the valve status, either the low-pressure pump map or the high-pressure pump map is used for determining the volume flow control deviation.

3. The method according to claim 2, which comprises determining the volume flow balance based on the volume flow control deviation plus a difference between the total volume flow demand and the volume flow available from the main oil pump.

4. The method according to claim 1, which comprises providing the main oil pump as a fixed displacement pump.

5. The method according to claim 1, which comprises:
providing the main oil pump as a variable displacement pump; and
calculating an adjustment factor by dividing the total volume flow demand by a maximum possible delivery volume flow of the variable displacement pump, wherein, if the adjustment factor assumes a value of less than one, a variable volume flow is calculated by multiplying the adjustment factor by the maximum possible delivery volume flow of the variable displacement pump, and otherwise the maximum possible delivery volume flow of the variable displacement pump is used as the volume flow available from the variable displacement pump.

6. The method according to claim 1, which comprises feeding the low-pressure branch with the additional oil pump precisely when the total volume flow demand cannot be covered solely by the volume flow available from the main oil pump, but a volume flow demand of the high-pressure branch can be covered by the volume flow available from the main oil pump.

7. The method according to claim 1, which comprises delivering into the high-pressure branch with the additional oil pump when the volume flow available from the main oil pump alone can neither cover the total volume flow demand nor a volume flow demand of the high-pressure branch.

8. The method according to claim 1, which comprises ensuring, through use of a suitable system configuration, a supply to the low-pressure branch through leakage.

9. The method according to claim 1, which comprises supplying, in driving situations in which the internal combustion engine is switched off, at least the high-pressure branch by using the additional oil pump, wherein gears are selected and deselected or preselected depending on a speed of the motor vehicle in order to avoid high rotation speeds of transmission components or a clutch components co-rotating on an output side.

10. A control configuration, comprising:
 a control unit for at least one of an open-loop control and a closed-loop control of a hydraulic system of a motor vehicle, wherein a main oil pump is driven by an internal combustion engine, wherein an additional oil pump is driven by an electric motor, wherein a high-pressure branch is at least partially fed by the main oil pump, wherein one of the high-pressure branch and a low-pressure branch is fed by the additional oil pump in dependence on a switch position of a switching valve, wherein the additional oil pump is used for feeding one of the high-pressure branch and the low-pressure branch in dependence on a total volume flow demand and a volume flow available from the main oil pump; and
 said control unit determining a nominal rotation speed of the electric motor based on a volume flow balance, a valve status of the switching valve, and one of a low-pressure pump map and a high-pressure pump map, wherein depending on the valve status of the switching valve, either the low-pressure pump map or the high-pressure pump map is used for determining the nominal rotation speed of the electric motor.

11. A hydraulic system comprising:
 a main oil pump driven by an internal combustion engine;
 an additional oil pump;
 a high-pressure branch configured to be at least partially fed by said main oil pump;
 a low-pressure branch;
 a switching valve, one of said high-pressure branch and said low-pressure branch being fed by said additional oil pump in dependence on a switch position of said switching valve, wherein said additional oil pump feeds one of said high-pressure branch and said low-pressure branch in dependence on a total volume flow demand and a volume flow available from said main oil pump; and
 said additional oil pump being driven by an electric motor, wherein a nominal rotation speed of said electric motor is determined based on a volume flow balance, a valve status of said switching valve, and one of a low-pressure pump map and a high-pressure pump map such that, depending on the valve status of said switching valve, either the low-pressure pump map or the high-pressure pump map is used for determining the nominal rotation speed of said electric motor.

* * * * *